(12) United States Patent
Winkler et al.

(10) Patent No.: US 8,684,147 B2
(45) Date of Patent: Apr. 1, 2014

(54) COMBINED VEHICLE BRAKE WITH ELECTROMECHANICALLY ACTUABLE PARKING BRAKE

(75) Inventors: Thomas Winkler, Mainz (DE); Anja Klimt, Frankfurt/M (DE); Thomas Hess, Seeheim-Jugenheim (DE); Willi Zeig, Einhausen (DE); Marcus Schumann, Edingen-Neckarhausen (DE)

(73) Assignee: Continental Teves AG & Co. oHG (DE)

( * ) Notice: Subject to any disclaimer, the term of this patent is extended or adjusted under 35 U.S.C. 154(b) by 301 days.

(21) Appl. No.: 12/739,850

(22) PCT Filed: Oct. 21, 2008

(86) PCT No.: PCT/EP2008/064209
§ 371 (c)(1),
(2), (4) Date: Apr. 26, 2010

(87) PCT Pub. No.: WO2009/053359
PCT Pub. Date: Apr. 30, 2009

(65) Prior Publication Data
US 2011/0162935 A1 Jul. 7, 2011

(30) Foreign Application Priority Data

Oct. 27, 2007 (DE) .......................... 10 2007 051 455
Oct. 15, 2008 (DE) .......................... 10 2008 051 350

(51) Int. Cl.
*F16D 55/26* (2006.01)
*F16D 55/02* (2006.01)

(52) U.S. Cl.
USPC .......................... 188/72.6; 188/72.8; 188/156

(58) Field of Classification Search
USPC ............ 188/72.1, 72.4, 72.6, 72.7, 72.8, 156, 188/157; 74/89.23, 89.37, 89.39
See application file for complete search history.

(56) References Cited

U.S. PATENT DOCUMENTS

| 2,767,593 A | 10/1956 | Hogan | |
|---|---|---|---|
| 5,514,173 A * | 5/1996 | Rebell et al. | 607/127 |
| 6,761,252 B1 * | 7/2004 | Weiler et al. | 188/72.7 |
| 2003/0094851 A1 * | 5/2003 | Berra et al. | 303/22.4 |
| 2005/0247149 A1 | 11/2005 | Osterlanger et al. | |
| 2008/0283345 A1 * | 11/2008 | Balz et al. | 188/72.6 |
| 2009/0283371 A1 * | 11/2009 | Winkler et al. | 188/72.6 |

FOREIGN PATENT DOCUMENTS

| DE | 76 40 810 | 7/1977 |
|---|---|---|
| DE | 101 50 803 B4 | 5/2003 |
| DE | 103 15 219 A1 | 7/2004 |
| WO | WO 2004/055415 A1 | 7/2004 |
| WO | WO-2007051809 A1 * | 5/2007 |

* cited by examiner

*Primary Examiner* — Melody Burch
(74) *Attorney, Agent, or Firm* — RatnerPrestia

(57) ABSTRACT

A combined vehicle brake which has a hydraulically actuable service brake and an electromechanically actuable parking brake device, a hydraulic service pressure space being delimited in a brake housing by a brake piston which can be acted upon by hydraulic pressure medium in order to execute service braking operations, so that the brake piston can be actuated along a piston longitudinal axis in order to achieve a braking action, and the parking brake device acting on the brake piston by a gear, in that the gear converts the rotational movement of an electromechanical actuator into a translational movement and causes an actuation of the brake piston in order to execute parking braking operations and holds the said brake piston in the actuated position, the gear having a threaded spindle and a threaded nut which are in contact with one another via a plurality of rolling bodies.

7 Claims, 2 Drawing Sheets

COMBINED VEHICLE BRAKE WITH ELECTROMECHANICALLY ACTUABLE PARKING BRAKE

CROSS REFERENCE TO RELATED APPLICATIONS

This application is the U.S. national phase application of PCT International Application No. PCT/EP2008/064209, filed Oct. 21, 2008, which claims priority to German Patent Application No. 10 2007 051 455.9, filed Oct. 27, 2007 and German Patent Application No. 10 2008 051 350.4, filed Oct. 15, 2008, the contents of such applications being incorporated by reference herein.

BACKGROUND OF THE INVENTION

1. Field of the Invention

The present invention relates to a combined vehicle brake which has a hydraulically actuable service brake and an electromechanically actuable parking brake device, a hydraulic service pressure space being delimited in a brake housing by a brake piston which can be acted upon by hydraulic pressure medium in order to execute service braking operations, so that the brake piston can be actuated along a piston longitudinal axis in order to achieve a braking action, and a parking brake device acting upon the brake piston by means of a gear, in that the gear converts the rotational movement of an electromechanical actuator into a translational movement and causes an actuation of the brake piston in order to execute parking braking operations and holds the said brake piston in the actuated position, the gear having a threaded spindle and a threaded nut which are in contact with one another via a plurality of rolling bodies.

2. Description of the Related Art

A hydraulic vehicle brake of this type with an electrically actuable parking brake device is known, for example, from DE 101 50 803 B4, which is incorporated by reference. In the known vehicle brake, a gear is provided, which, on the operative principle of a threaded-nut/spindle arrangement, converts the rotational movement of the electric motor into a longitudinal movement of the brake piston in order to achieve a parking force. According to an exemplary embodiment, this gear unit is designed as what is known as a "spindle/ball recirculation bush arrangement" which is also referred to as a ball screw or ball recirculation spindle. These ball screws have a threaded spindle and a threaded nut which are in contact with one another via a plurality of rolling bodies.

A screw nut with a rolling-body arrangement, without what is known as ball recirculation, is known from German utility model DE 76 40 810 U, which is incorporated by reference. The disadvantage of this arrangement is that, when the arrangement is actuated, the rolling bodies are pressed against one another and friction is generated which adversely influences the efficiency of the arrangement. An object of the present invention, therefore, is to improve a combined parking brake of the generic type mentioned in the introduction, to the effect that the efficiency is increased.

SUMMARY OF THE INVENTION

There is provision for the rolling bodies to be arranged so as to be movable to a limited extent between two stops in the thread flight, a spring element being arranged between the rolling bodies and a stop and allowing a slipping of the rolling bodies in the event of a load-free actuation of the gear and causing a rolling of the rolling bodies in the event of an actuation of the gear under load, and at least one further spring element being provided between the rolling bodies as an intermediate spring element which reduces the frictional force of the rolling bodies with respect to one another when the gear is actuated. In this case, the intermediate springs keep an excursion in reserve, since the balls seated on the outside in a load-free situation due to the spring prestress have to roll on a smaller diameter in the event of actuation under load.

In an advantageous development, a second spring element is provided which is arranged between the rolling bodies and the other stop.

The ratio of the number of rolling bodies to the number of intermediate spring elements is constant, so that, in the case of a larger number of rolling bodies, a larger number of intermediate spring elements is also used.

In an especially advantageous development, there is provision for the intermediate spring elements to be distributed uniformly between the rolling bodies. By virtue of this measure, a uniform reduction in the frictional force of the rolling bodies with respect to one another is implemented.

The intermediate spring elements are designed as helical compression springs or as elastomeric springs.

In an advantageous development, the stops are connected non-positively to the threaded nut or are produced in one piece with the threaded nut.

In a further advantageous refinement, the first stop has a bearing face for the spring element, while the other stop has a bearing face for the second spring element which acts as a precompression spring element.

BRIEF DESCRIPTION OF THE DRAWINGS

The invention is explained in more detail below by means of an exemplary embodiment, in conjunction with the accompanying drawing in which.

DETAILED DESCRIPTION OF THE PREFERRED EMBODIMENTS

Figure 1:
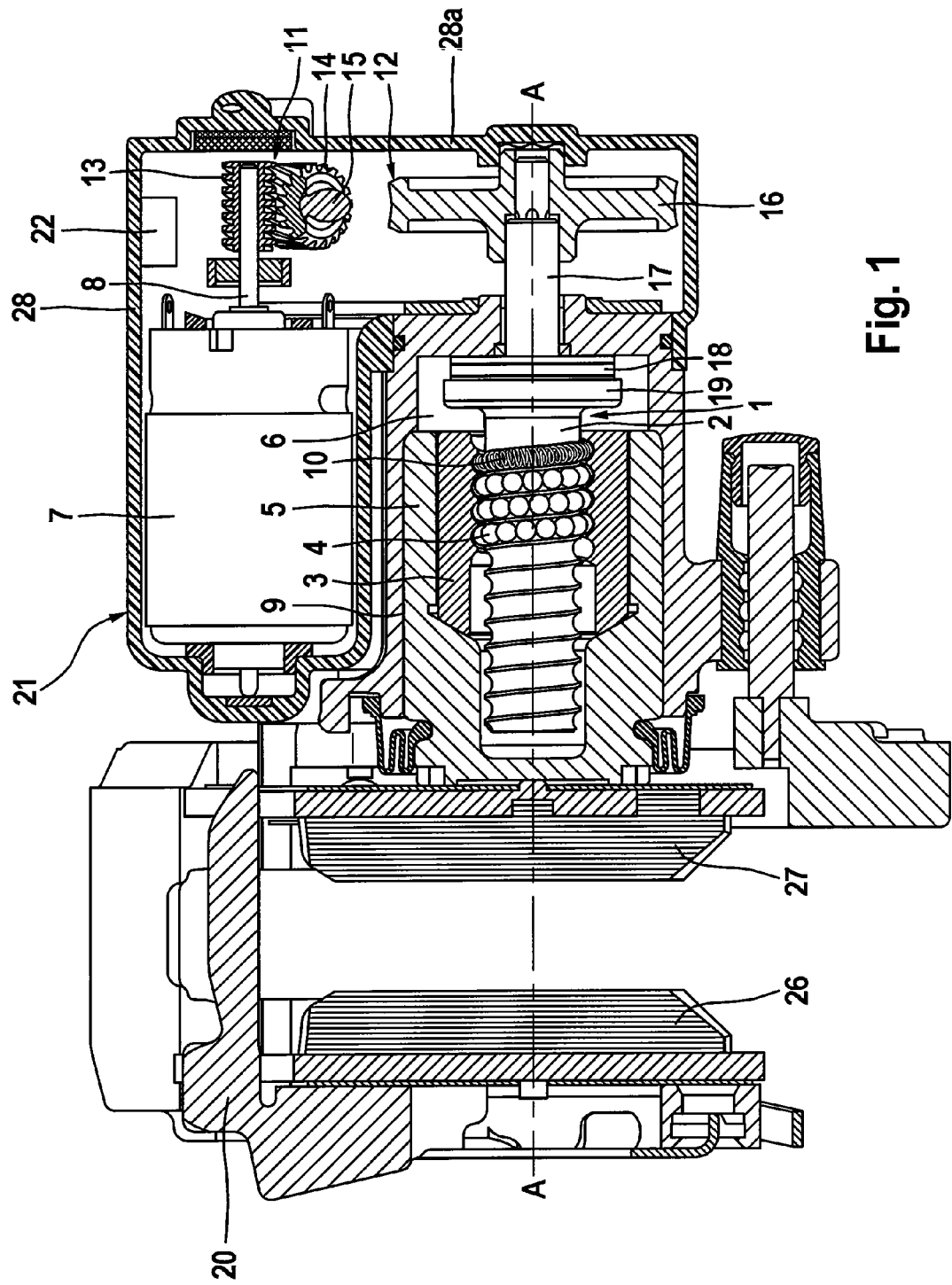
FIG. 1 shows a sectional illustration of a vehicle brake with a hydraulically actuable service brake and with an electromechanically actuable parking brake.

The hydraulic vehicle brake illustrated in FIG. 1 has, on the one hand, a hydraulically actuable service brake and, on the other hand, an electromechanically actuable parking brake. In the example shown, the vehicle brake is designed as a floating-calliper disc brake, of which the function caused by hydraulic actuation is well known to a person skilled in the art active in this field and therefore does not need to be explained in any more detail. The actuation of the parking brake is effected by an electromechanical actuator 7 or electric motor 7 which, together with a two-stage gear, with the required sensor equipment and with an electronic control unit 22, is integrated in a drive module 21. The abovementioned vehicle brake has, furthermore, a brake housing or a brake calliper 20 which surrounds the outer margin of a brake disc, not illustrated, and two brake linings 26, 27 arranged on both sides of the brake disc. The brake housing 20 forms on its inside a brake cylinder 9 which receives a brake piston 5 axially displaceably. In order to execute service braking operations, brake fluid can be fed into the service pressure space 6 formed between the brake cylinder 9 and brake piston 5, so as to build up a brake pressure which displaces the brake piston 5 axially along a piston longitudinal axis A towards the brake disc. The brake lining 27 facing the brake piston 5 is thereby pressed against the brake disc, and, in reaction, the brake housing 20 is displaced in the opposite direction and thereby also presses the other brake lining 26 against the brake disc.

As already mentioned, a parking brake device can be actuated electromechanically in order to execute parking braking operations and likewise acts on the brake piston 5. For this purpose, a gear 1 is provided, which converts the rotational movement of the electromechanical actuator 7 or electric motor 7 into a translational movement and which causes an actuation of the brake piston 5 along the axis A. The gear 1 is formed essentially by a threaded spindle 2 and a threaded nut 3 which are connected to one another via rolling bodies 4. The rolling bodies 4 are designed as balls. A shank 17 connected to the threaded spindle 2 projects out of the brake housing 20 on the side facing away from the brake disk and is driven by the above-mentioned electromechanical actuator 7, with a two-stage reduction gear being interposed. In this case, means for sealing off the service pressure space 6 are provided in that bore of the brake housing 20 through which the shank 17 projects. The rotational movement transmitted to the threaded spindle 2 is transmitted, via the balls 4 which are located in the thread flight between the threaded spindle 2 and threaded nut 3, to the threaded nut 3 which executes a translational movement in the direction of the axis A.

As a result, the brake piston 5, on which the threaded nut 3 is supported, is also actuated. At the same time, the threaded spindle 2 is received by a stepped bore 30 in the brake housing 20 and is supported on the brake housing 20 via a collar 19 connected to the spindle 2 and via an axial bearing 18. The gear 1 therefore converts the rotational movement of the electromechanical actuator 7 into a linear movement and is responsible for generating the brake application force for executing a parking braking operation.

When the parking brake device is released, the electric motor 7 is operated correspondingly in the opposite direction, and the threaded nut 3 and therefore also the brake piston 5 execute a movement to the right in the drawing. The brake linings 26, 27 are no longer in contact with the brake disc and the parking braking operation is terminated.

The abovementioned electric motor 7 and the two-stage gear are received by a housing 28 which belongs to the drive module 21 and which can be closed by means of a housing cover 28a. In the embodiment illustrated in FIG. 1, the two-stage gear is designed as a worm gear 11, 12. Worm gears are a category of helical rolling gears in which, in contrast to rolling gears, a sliding fraction is also present in the movement. Such a worm gear is constructed from a helically toothed wheel, from a worm and from a spur-toothed wheel, the worm wheel, meshing with it.

The first gear stage, that is to say the first worm gear 11, is connected on the input side to the output shaft 8 of the electric motor 7, while the second gear stage, that is to say the second worm gear 12, is connected on the output side to the shank 17 or to the gear 1 or 2, 3. As illustrated, a first worm 13 is plugged onto the output shaft 8 of the electric motor 7 and meshes with a first worm wheel 14. A second worm 15 is plugged onto the centre of rotation of the first worm wheel 14 and is set in rotation by the latter. The second worm 15 meshes, in turn, with a second worm wheel 16 which is connected fixedly in terms of rotation to the shank 17 and which sets the shank 17, together with the gear 1, in rotation and at the same time generates a translational movement of the brake piston 5. So that the brake application force set in this way is maintained during a parking braking operation, the second worm gear 12 has a self-locking design.

In the event of an actuation of the gear 1 under load, the rolling bodies 4 roll in the thread flight. As a result, a relatively high efficiency of 85% to 95% is achieved, or, taking into account the frictional losses on the axial bearing 18, of 75% to 85%. In the event of load-free actuation of the gear 1, by contrast, the rolling bodies 4 slip, that is to say the balls 4 slip until the brake lining 34 assigned to the brake piston 5 bears against the brake disc, not illustrated, because there is in this case virtually load-free actuation. The balls 4 begin to revolve or to roll only under load. The gear 1 thus acts at the same time as readjustment if the brake linings 26, 27 are worn. Dispensing with a separate readjustment device or integrating a readjustment device and actuating device into a single component is especially cost-effective and at the same time robust. So that the rolling of the rolling bodies 4 under load and slipping in the event of a load-free actuation of the gear 1 are always possible, a spring element 10 is provided which keeps in reserve a rolling excursion for the rolling of the rolling bodies 4. In this case, however, it may happen that the rolling bodies 4 are pressed against one another and generate friction when they roll one against the other. The friction of the rolling bodies 4 with respect to one another is detrimental to the efficiency of the gear 1, so that further intermediate spring elements 25 are arranged between the rolling bodies 4, which lower the pressure force between the rolling bodies 4 and thus reduce the frictional force between the rolling bodies 4. The more rolling bodies 4 are used in the gear 1, the more intermediate spring elements 25 are employed, so that the ratio of the number of rolling bodies 4 to the number of intermediate spring elements 25 is constant.

The number and position of the intermediate spring elements 25 may be varied in order to reduce the friction between the rolling bodies 4 effectively. In the embodiment illustrated in FIG. 2, the intermediate spring elements 25 are distributed uniformly between the rolling bodies 4, that is to say the next intermediate spring element 25 is arranged after a predetermined number of rolling bodies 4. By virtue of this measure, a uniform reduction in the frictional force of the rolling bodies (4) with respect to one another is implemented.

Figure 2:
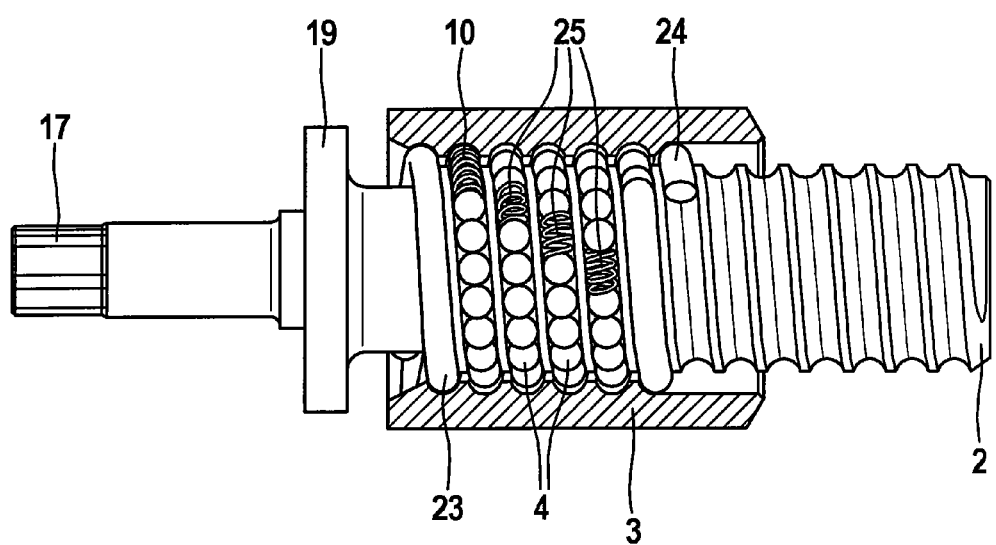
FIG. 2 shows a gear, capable of being used in the vehicle brake according to FIG. 1, for converting a rotational movement into a translational movement.

As illustrated in FIG. 2, the intermediate spring elements are formed by helical compression springs. However, for example, elastomeric springs may also be envisaged.

The rolling bodies 4 are arranged so as to be movable to a limited extent in the thread flight between two stops 23, 24, the abovementioned spring element 10 for keeping a rolling excursion for the rolling bodies 4 in reserve being arranged between the rolling bodies and the first stop 23. The first stop 23 therefore has a bearing face for the spring element 10. A second spring element, not illustrated, is arranged between the rolling bodies 4 and the other stop 24 and serves as what is known as a precompression spring. This precompression spring is supported on the second stop 24 which has a stop face for the precompression spring element, not illustrated. The two stop 23, 24 are connected non-positively to the threaded nut 3 or are produced in one piece with the threaded nut 3.

Thus, by the intermediate springs 25 being received between the rolling bodies 4, the friction of the rolling bodies 4 with respect to one another is reduced, and therefore the efficiency of the gear 1 is improved and, at the same time, the wear of the rolling bodies 4 is minimized.

The invention claimed is:
1. Combined vehicle brake comprising:
a hydraulically actuable service brake,
an electromechanically actuable parking brake device,
a hydraulic service pressure space being delimited in a
brake housing by a brake piston which can be acted upon by hydraulic pressure medium in order to execute service braking operations, so that the brake piston can be actuated along a piston longitudinal axis in order to achieve a braking action, said parking brake device acting on the brake piston by a gear, wherein the gear converts a rotational movement of an electromechanical actuator into a translational movement and causes an actuation of the brake piston in order to execute parking braking operations and holds the brake piston in the actuated position, said gear having a threaded spindle that is rotatable and a threaded nut which are in contact with one another via a plurality of rolling bodies, wherein the rolling bodies are arranged so as to be movable to a limited extent in a thread flight between two stops, wherein rotational movement of the threaded spindle is transmitted via the rolling bodies to the threaded nut to execute a translational movement of the threaded nut, a first spring element arranged between the rolling bodies and one of the two stops and allowing a slipping of the rolling bodies in an event of a load-free actuation of the gear and causing a rolling of the rolling bodies in an event of an actuation of the gear under load, and one or more intermediate spring elements provided between the rolling bodies which reduces a frictional force of the rolling bodies with respect to one another when the gear is actuated, wherein a second spring element is provided, which is arranged between the rolling bodies and the other of the two stops, and wherein the threaded nut is not biased by a spring along the piston longitudinal axis toward the actuated position of the brake piston.

2. Combined vehicle brake according to claim 1, wherein a ratio of a number of the rolling bodies to a number of the intermediate spring elements is constant.

3. Combined vehicle brake according to claim 1, wherein the intermediate spring elements are distributed uniformly between the rolling bodies, in order to implement a uniform reduction in the frictional force of the rolling bodies with respect to one another.

4. Combined vehicle brake according to claim 1, wherein the intermediate spring elements are helical compression springs.

5. Combined vehicle brake according to claim 1, wherein the stops are connected non-positively to the threaded nut or are produced in one piece with the threaded nut.

6. Combined vehicle brake according to claim 1, wherein the first stop has a bearing face for the first spring element, while the other stop has a bearing face for said second spring element.

7. Combined vehicle brake according to claim 1, wherein each of the one or more intermediate spring elements is/are shorter than the first spring element.

* * * * *